UNITED STATES PATENT OFFICE 2,003,235

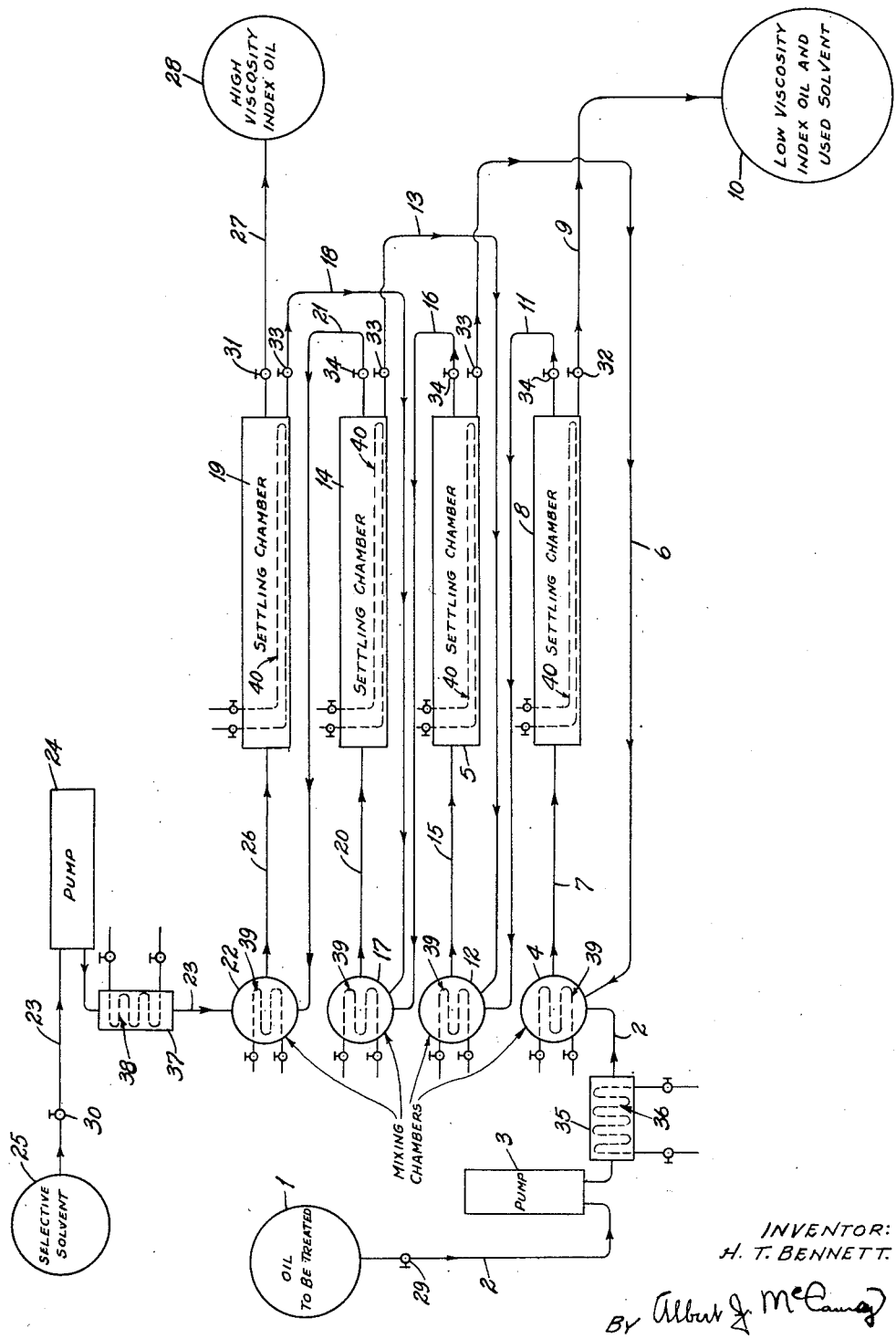

PROCESS OF MANUFACTURING HIGH VISCOSITY INDEX OILS

Harry T. Bennett, Tulsa, Okla., assignor to Mid-Continent Petroleum Corporation, Tulsa, Okla., a corporation of Delaware Application May 2, 1932, Serial No. 608,590

7 Claims. (Cl. 196—13)

This invention relates to processes of manufacturing high viscosity index oils, the object being to provide a practicable method of obtaining various advantages in the manufacture of oils having high viscosity indices from oils having lower viscosity indices. The invention herein disclosed is more broadly claimed in an application filed by me on March 2, 1931, Serial Number 519,698, and the present invention is a continuation in part of said application Serial Number 519,698.

The viscosity index of an oil is a number indicating the extent to which its viscosity will change when the temperature is increased from 100° F. to 210° F.

The viscosity of an oil having a low viscosity index will change very greatly in response to changes in temperature, while an oil having a high viscosity index will withstand such variations in temperature, without undergoing the same degree of change in its viscosity.

Prior to my invention in this art, attempts were made to increase the viscosity index of lubricating oils with a selective solvent. These old proposed methods of treating the oils include batch operations, in which the oil and solvent are placed in a container and heated to a high temperature, agitated, then cooled and allowed to settle into layers where the dissolved oil and low viscosity index constituents are separated from the high viscosity index constituents of the oil.

These old batch operations have proven unsatisfactory due partly to the evaporation of the solvent at elevated temperatures, this being especially true of the highly volatile solvents which others have recommended for work of this kind, and in carrying out the operations on a large scale a substantial advantage is gained by minimizing, or eliminating the cost of heating and cooling the oil and solvent. Moreover, the length of time required to complete the treatment of a single batch of oil and solvent is a disadvantage in the commercial production of large quantities of high viscosity index oils.

An object of this invention, therefore, is to provide a highly efficient process wherein a relatively low viscosity index oil may be continuously treated with a solvent to produce a high viscosity index oil.

Another object of this invention is to provide a simple and effective process of producing high viscosity index oils wherein all of the operations may be carried out at a relatively low temperature.

A further object of this invention is to provide an inexpensive process wherein a selective solvent may be repeatedly employed to remove low viscosity index constituents from the oil. To permit repeated use of the solvent for an indefinite period, it is preferably recovered from the constituents of the oil, by distillation, as hereafter described.

The drawing is a diagrammatical view of one form of an apparatus wherein this invention may be carried out.

The oil to be treated may be confined in container 1 from which it may be transferred through pipes 2 and pump 3 to a mixer 4 where it may be agitated with the solvent-oil solution from settler 5. This solvent-oil solution may be transmitted from the settler 5 through the pipe 6 to the mixer 4.

From the mixer 4 the solvent and oil mixture is transferred through a pipe 7 to a settler 8 where the high viscosity index constituents rise to the top and the low viscosity index constituents which are dissolved in the solvent settle to the bottom. The low viscosity index constituents, which are dissolved in the solvent, are then withdrawn from the settler 8 through a pipe 9 to a storage tank 10.

The upper layer containing the high viscosity index constituent may be transmitted through a pipe 11 to a mixer 12 where it is treated with the oil and solvent solution entering through a pipe 13 from a settler 14.

The oil-solvent mixture in the mixer 12 may be transferred through a pipe 15 to the settler 5 where the higher viscosity index constituents rise to the top and the lower viscosity index constituents, which are dissolved in the solvent, settle to the bottom. The low viscosity index solution is then transferred through the pipe 6 to the mixer 4.

The upper layer containing the higher viscosity index constituents may be transmitted through a pipe 16 to a mixer 17 where it is treated with the oil-solvent solution entering through pipe 18 from a settler 19.

The oil-solvent mixture in the mixer 17 may be transferred through a pipe 20 to the settler 14 where the higher viscosity index constituents rise to the top and the lower viscosity index constituents, which are dissolved in the solvent, settle to the bottom. The low viscosity index solution is transferred through the pipe 13 to the mixer 12.

The upper layer containing the high viscosity index constituent may be transferred through pipe 21 to the mixer 22 where it is treated with the incoming solvent entering the system through pipes 23 and pump 24 from the supply container 25.

The oil and solvent mixture in mixer 22 is transferred through a pipe 26 to the settler 19 where the higher viscosity index constituents rise to the top and the lower viscosity index constituents settle to the bottom. The low viscosity index solution is then transferred through the pipe 18 to the mixer 17.

The high viscosity index constituents are discharged from the system through the pipe 27 to a storage container 28.

The oil entering the system through the pipes 2 is, therefore, subjected to successive mixing and settling operations wherein the solvent entering the system through the pipes 23 is repeatedly employed to remove the low viscosity index constitutents.

The incoming solvent removes part of the low viscosity index constituent during the treatment in mixer 22 and settler 19 and removes a further portion of the low viscosity index constituents after each mixing and settling operation until the solvent containing the dissolved low viscosity index constituents is finally discharged from the system through pipe 9.

The supply of oil to the system may be controlled by regulating the valve 29 in the pipe 2 and by increasing or decreasing the speed of the pump 3. The supply of solvent may be likewise controlled by regulating the valve 30 in the pipe 23 and by increasing or decreasing the speed of the pump 24.

The discharge of high viscosity index constituents from the system may be regulated by the valve 31 in the pipe 27, and the discharge of the solvent solution containing the dissolved low viscosity index constituents may be regulated by the valve 32 in the pipe 9.

The discharge of the oil-solvent solution from the settlers 19, 14 and 5 may be regulated by the valves 33 and the discharge of the higher viscosity index constituents from the settlers 14, 5 and 8 may be regulated by the valves 34.

The temperature of the incoming oil may be controlled by the heat exchanger 35 provided with a pipe coil 36 through which a heating or cooling medium may be transmitted to bring the oil to the desired temperature.

The temperature of the incoming solvent may be controlled by a similar heat exchanger 37 which is provided with a pipe coil 38 through which a heating or cooling medium may be transmitted to bring the solvent to the desired temperature.

The mixers and settlers may be provided with internal pipes 39 and 40 through which a heating or cooling medium may be transferred to regulate the temperature therein.

As a specific illustration of my invention, I will hereafter describe how a Mid-Continent lubricating oil having a Saybolt universal viscosity of 150 at 210° F. and a viscosity index of 73 may be treated in accordance with my invention.

The oil may be continually pumped from the tank 1 into the system and the solvent which may be dichlorethyl ether is continually pumped through the pipe 23 into the system. The dichlorethyl ether is also known as dichlor-diethyl ethers. The rate of flow of the solvent may be so regulated that the solvent enters the system in a quantity about four times the quantity of oil entering the system.

The temperature of the incoming oil and solvent is predetermined by passing a heating or cooling medium through the coils 36 and 38 of the heat exchangers 35 and 37 so that the oil and solvent enter the system at about 100° F. This temperature, or a temperature within 5° F. thereof is preferably maintained during the mixing and settling operations.

After the oil enters the system, it is subjected to successive mixing and settling operations in the mixers 4, 12 and 17 and settlers 8, 5 and 14 wherein the previously used solvent is employed to remove the low viscosity index naphthenic fractions from the oil until the oil is finally treated with the fresh incoming solvent in the mixer 22 and settler 19 as a final step in removing the low viscosity index constituents of the oil. In the specific example referred to, the high viscosity index paraffinic portion of the oil which is discharged from the system through pipe 27 is about 50% of the oil entering the system and has a viscosity index of 100 after removing any solvent contained therein.

The solvent containing the low viscosity index constituents, after the preliminary treatment of the incoming oil, is discharged from the system through pipe 9.

The solvent may be recovered from the resultant fractions of the oil by separately distilling the same in ordinary stills. However, to avoid unnecessary illustration in the drawing, I have not shown the distilling apparatus, nor the means for conducting the recovered solvent to the solvent container 25.

The foregoing specific description has been given merely as an illustration of one manner of carrying out this invention, and it is obvious that the invention extends to various modifications. In actual practice the high viscosity index of the product will depend partly upon the original oil to be treated, the kind of solvent used, the quantity of solvent, and partly upon the number of mixing and settling operations to which the oil is subjected, all of which may be varied to obtain the results desired.

The temperature at which the oil is treated will usually vary with the viscosity of the oil to be treated and with the results desired. In other words, the temperature may be increased with relatively high viscosity oils and decreased with lower viscosity oils, and the temperature may also be increased to produce higher viscosity index oils. When using such solvents as beta beta' dichlorethyl ether, I have found that good results may be obtained within a temperature range of 80° F. to 105° F.

In general the temperature may be such that the solvent is soluble with the low viscosity index constituents of the oil to be removed, and by controlling the temperature so that the solvent is soluble with these low viscosity index constituents, the viscosity index of the resultant high viscosity index oil can be predetermined.

However, a substantial advantage is gained by performing the mixing and settling operations at the very low temperatures herein disclosed, as this eliminates losses heretofore incurred by vaporizing the solvent at the high temperatures previously employed to unite the solvent with the low index constituents. To avoid such high temperatures, a cooling fluid may be transmitted through the coils 36, 38, 39 and 40 when the atmospheric temperature is very high, and the desired products can be obtained by using a relatively large quantity of solvent, sufficient to remove all of the undesirable low viscosity index constituents. The successive treatments herein disclosed also aid in effectively removing these constituents at the low temperatures.

I claim:

1. The process of treating oils having high and low viscosity index constituents which comprises agitating a mixture of oil and dichlorethyl ether at a temperature at which the dichlorethyl ether is soluble with the low viscosity index constituents of the oil, and separating the solution of dichlorethyl ether and low viscosity index constituents from the high viscosity index constituent at approximately the same temperature at which the oil and dichlorethyl ether were agitated.

2. The process of treating oils having high and low viscosity index constituents which comprises agitating a mixture of oil and dichlorethyl ether at a temperature of not less than 80° F. nor more than 105° F. to form a solution wherein the constituents having a relatively low viscosity index are dissolved in the dichlorethyl ether, then separating said solution from the constituent having a higher viscosity index, and separately removing the dichlorethyl ether from the resultant products.

3. A process of treating an oil having high and low viscosity index constituents with a selective solvent which comprises introducing dichlorethyl ether into a system wherein the oil is to be treated, introducing the oil to be treated into said system, subjecting the oil to successive treatments with successive portions of the dichlorethyl ether so that after each treatment the solvent contains a greater amount of dissolved low viscosity index constituents, and separately discharging the resultant high viscosity index product and the solvent containing the dissolved low viscosity index constituents from said system.

4. The method of improving the viscosity index of lubricating oils, which comprises mixing said oils with dichlor-diethyl ether, separating the mixture into an oil phase and a dichloro-diethyl ether phase, removing said ether phase from said oil phase, mixing said oil phase with further amounts of dichlor-diethyl ether, separating this mixture into an oil phase and a dichlor-diethyl ether phase, removing said last-named oil phase from said last-named ether phase and removing dissolved ether from said oil phase.

5. In the art of producing high viscosity index lubricating oils, the continuous method including successive mixing and settling operations wherein dichlorethyl ether is repeatedly employed as a selective solvent to separate high and low index constituents of the oil to be treated, said method including the steps of introducing a stream of said dichlorethyl ether into a system wherein the oil is treated, introducing a stream of the oil to be treated in said system, mixing the incoming oil with the low viscosity index residual solution resulting from another of said mixing and settling operations, settling the resultant mixture so as to separate low viscosity index constituents from higher viscosity index constituents of said incoming oil, mixing the incoming stream of dichlorethyl ether with the relatively high index constituents and permitting the mixture to settle and thereby separate into a product having a still higher viscosity index and a residual solution containing lower index constituents, the low index residual solution being transmitted to and mixed with the stream of incoming oil so as to maintain the continuous flow wherein the oil to be treated is subjected to a preliminary action of the residual solution resulting from a previous operation and a subsequent action of the incoming dichlorethyl ether, each of said settling operations being performed while all of the constituents of the mixture to be settled are slowly advancing in the same general direction, from an inlet for the mixture at one end of the settling zone to separated outlets for the light and heavy fractions at the opposite end of said settling zone.

6. In the art of separating light and heavy constituents of petroleum oils, a continuous counter-flow method including initial and final mixing and settling operations wherein dichlorethyl ether is repeatedly employed to separate light and heavy fractions of the oil to be treated, said method including the steps of introducing the dichlorethyl ether into the final mixing zone, thence through the final settling zone, and transmitting portions of said dichlorethyl ether from said final settling zone and through initial mixing and settling zones, in the order named, at the same time introducing the oil to be treated into the initial mixing zone, thence through the initial settling zone, and transmitting portions of said oil from said initial settling zone and through said final mixing and settling zones, in the order named, so as to transmit said portions of the oil from the initial mixing zone to the final settling zone, while said portions of the dichlorethyl ether are flowing reversely from the final mixing zone to the initial mixing zone, and preventing such reverse flow in each settling operation by causing all of the constituents of the mixture to slowly advance in the same general direction in an elongated course from an inlet for the mixture to separated outlets for the light and heavy constituents.

7. The process of treating lubricating oil stock having high and low viscosity index constituents with dichlorethyl ether to produce a relatively high viscosity index lubricating oil, which comprises separately regulating the temperature of streams of the oil and dichlorethyl ether to provide the desired solubility, continuously introducing the stream of dichlorethyl ether into a mixing zone in a system wherein the oil is to be treated, continuously introducing the stream of oil to be treated into another mixing zone in said system, and subjecting the oil to successive mixing and settling operations wherein the dichlorethyl ether is repeatedly employed to separate the lower viscosity index constituents of the oil from the high viscosity index constituents, and regulating the temperature of the mixed constituents of said oil and dichlorethyl ether while they are passing through said system.

HARRY T. BENNETT.